Fig. 1.

INVENTOR.
BYRON A. RUNDE
BY Fidler, Crouse
& Beardsley
ATTORNEYS

Fig. 4.

July 8, 1952 B. A. RUNDE 2,602,530
BICOLOR RIBBON CONTROL FOR ACCOUNTING MACHINES
Filed Aug. 29, 1950 5 Sheets-Sheet 5

Fig. 5.

| LEDGER | | STATEMENT | | SALESMAN | |
|---|---|---|---|---|---|
| TRANSACTION | BAL | TRANSACTION | BAL | TRANSACTION | BAL |
| 10.00  JAN 10    50.00 | 60.00S | JAN 10    50.00 | 60.00S | JAN 10    50.00 | 60.00* |
| 60.00  JAN 15RT   5.00- | 55.00S | JAN 15RT   5.00 | 55.00S | JAN 15RT   5.00 | 55.00* |

Fig. 6.

INVENTOR.
BYRON A. RUNDE
BY Fidler, Crouse
& Beardsley
ATTORNEYS

Patented July 8, 1952

2,602,530

UNITED STATES PATENT OFFICE 2,602,530

BICOLOR RIBBON CONTROL FOR ACCOUNTING MACHINES

Byron A. Runde, Grosse Pointe Woods, Mich., assignor to Burroughs Adding Machine Company, Detroit, Mich., a corporation of Michigan Application August 29, 1950, Serial No. 182,041

6 Claims. (Cl. 197—157)

This invention relates to improvements in automatic control means for accounting machines and relates more particularly to improvements in bicolor ribbon control means.

In certain accounting work such, for example, as posting accounts receivable for merchandising businesses, certain items, such as returned merchandise items, are entered in red in certain columns on ledger, statement and sometimes other forms, in which other items, such as charges for merchandise sold, are entered in black. Such columns of accounting forms in which most items are entered in black and in which some items are entered in red may be adjacent columns or may be non-adjacent columns separated by other columns in which entries are to be made in black in machine operations intervening between machine operations in which items are printed in red in the previously mentioned columns. Known controls of bicolor ribbon mechanisms from subtract keys or bars of accounting machines are unsatisfactory for the reason that they require the operator to move the subtract key bar or lever to or hold it in subtraction position for each machine operation in which printing is to be effected in red and do not provide for red printing in machine operations in which a repeat print of an item is obtained by a subtotal or totaling operation. They also are not usable for effecting red printing in non-successive machine operations of a series of automatically initiated machine operations, in the intervening operations of which series black printing is to be effected. Known automatic bicolor ribbon controls in which the control is effected from the traveling paper carriage in accordance with the columnar positioning of the paper carriage are also unsatisfactory in that adjustment of the automatic control means is necessary before and after each line of entries in which red entries are to be made in columns in which entries are normally made in black.

An object of the present invention is to provide an improved automatic control means which can be conditioned manually at the start of a series of machine operations to condition the bicolor ribbon mechanism for printing in red in one or more subsequent machine operations of the series which are performed with the paper carriage in one or more selected columnar positions, though printing is effected in black in other machine operations of said series performed with the paper carriage in other columnar positions.

A further object of the invention is to provide a control mechanism which, after being placed in effective position by manipulation of a manipulative member at the start of the series of machine operations, will remain conditioned for at least one or more machine operations of the series notwithstanding automatic return of the manipulative member to normal condition in the course of the first machine operation of the series.

A further object of the invention is to provide a control mechanism as characterized above which will be returned automatically to its normal condition in that machine operation of the series by which the last of the red prints is effected.

A further embodiment of the invention is illustrated in the accompanying drawings in which.

The invention is shown in the accompanying drawings and described hereinafter as embodied in a Burroughs "Sensimatic" accounting machine like that shown in application of Thomas M. Butler, Serial No. 174,696, filed July 19, 1950, as a continuation-in-part of his original application Serial No. 85,971 filed April 7, 1949 and now abandoned, but it should be understood that the present invention is capable of modification to adapt it to other accounting machines. Portions of the machine disclosed in said Butler applications which are shown in the accompanying drawings and referred to hereinafter are identified by the same reference numbers by which they have been designated in those prior applications. Consistently with the description in said Butler applications the terms clockwise and counterclockwise will be employed to describe rotary or swinging movements of the parts as viewed from above, in front, or from the right side of the machine and the terms rightward, leftward, forward, rearward, upward, and downward will be employed to describe motions and positions of the parts as viewed normally from in front of the machine.

In the machine of the above-mentioned Butler applications the carriage borne automatic control elements are arranged in control "lanes" designated by the numbers 1 to 25 and the control mechanisms for various functions are referred to as being associated with respective ones of such numbered control "lanes."

Figure 1:
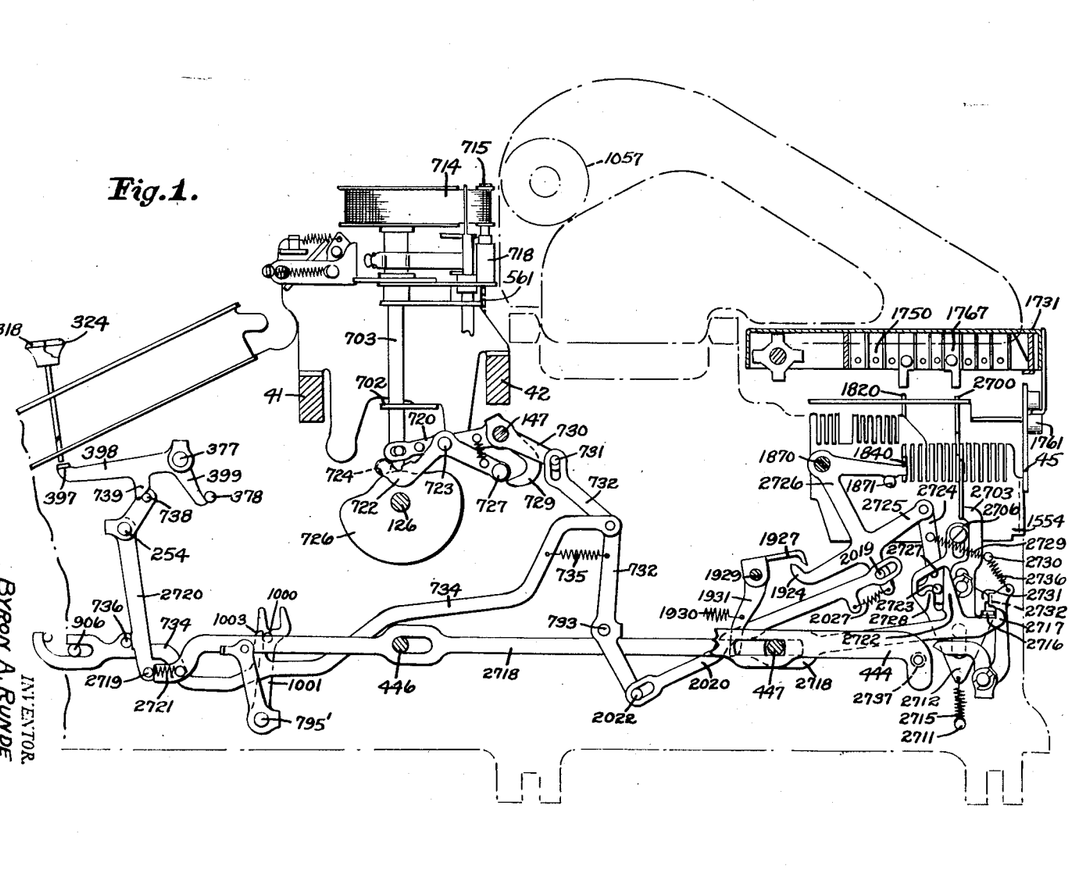
Figure 1 shows the improved control mechanism as seeen in right side elevation.
Figure 2:
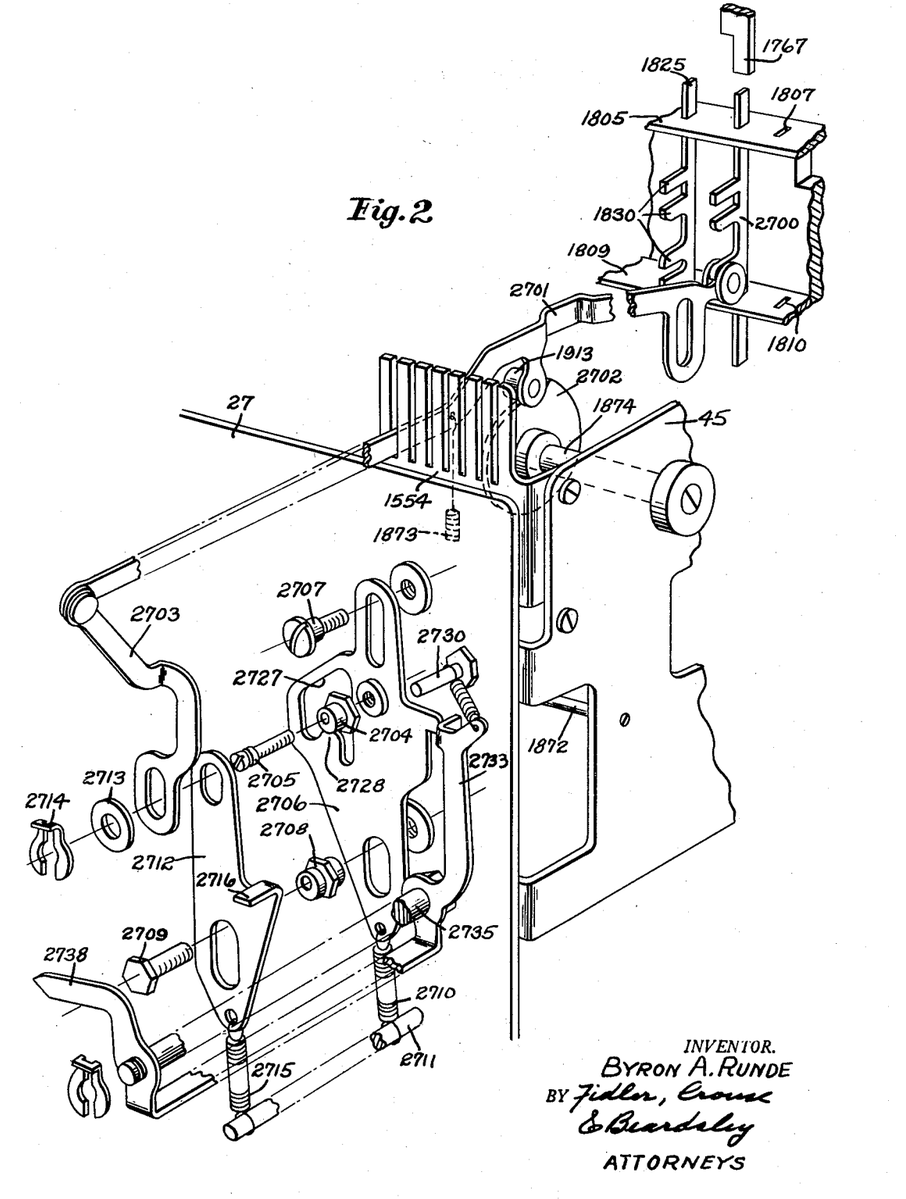
Fig. 2 is a perspective view as seen from the upper rear right corner of the machine, showing carriage controlled portions of the control mechanism in laterally separated relation.

The lane 12 control means of the machine of the above-mentioned Butler applications controls a bicolor ribbon mechanism which normally raises the ribbon 714 (Fig. 1) in each machine operation to place the upper black printing half of the ribbon between the type 561 and the printing line of the platen 1057 but, in a machine operation in which a #5 control projection 1767 is above lane 12 sensing pin 1820, a bell crank (now replaced by a modified bell crank 2726 as explained hereinafter) is rocked counterclockwise on the stud 1870, pulls a link 2020 rearwardly and thereby rocks a lever 732 counterclockwise to place a hook 729 under a roller 727 whereby the ribbon mechanism is conditioned so that when the ribbon 714 is raised, it is raised enough to place its lower red printing portion between the platen and the type at the printing line. The sensing pin 1820 and the control arm 1840 which rocks the above-mentioned bell crank, return to normal condition prior to operation of the printing mechanism in the machine cycle, but a latch bail 1927 having a depending latch lip at its rear edge cooperates with a latch point 1924 on the bell crank to hold the latter, the link 2020, lever 732 and red ribbon hook 729 in the red ribbon position until late in the machine cycle, relatively long after printing has been effected. As in the machine of the Butler applications, depression of either or both subtract keys 318 and 324 also rocks the lever 732 through the link 734 to place the red ribbon hook in red printing position under the roller 727 and the parts are then held in that position until, after printing in the machine cycle, the depressed subtract key or keys is or are returned to normal. The link 734, lever 732 and red ribbon hook 729 are also moved to red ribbon position automatically early in any machine cycle in which a negative total or subtotal is drawn from either crossfooter or totalizer.

In the machine disclosed in said Butler applications certain of the control lanes were left unused, including lane 19 which the bicolor ribbon control means of the present invention now utilizes. For the purposes of the present invention, an additional sensing pin 2700 is placed in the lane 19 apertures 1807 and 1810 in the guide strips 1805 and 1809 respectively, that is, the sensing pin 2700 is placed in the next position rearwardly from the lane 18 sensing pin 1825. The lower pair of lugs 1830 of the sensing pin 2700 embrace the leftward end of a control arm 2701 having, intermediate its ends, a downward projection carrying a cam follower roller 1913 bearing on the edge of a cam disk 2702 secured in the lane 19 position on the cam shaft 1874. A tension spring 1873 anchored at its lower end on the rod 1872 is connected at its upper end to the control arm 2701 at a point rightward of the roller 1913 and leftward of the guide comb 1554. The arm 2701 extends rightwardly through the lane 19 slot in the guide comb 1554 and is pivotally connected at its rightward end to the upper end of a link 2703 having in its lower end a vertically elongated slot receiving the rightward end of an eccentric sleeve 2704 rotatable on the shank of a screw stud 2705 threaded into a bushing fixed in a slide 2706. On the left end of the sleeve 2704 is a hexagonal flange permitting it to be held in a desired rotary position while the screw 2705 is tightened in the slide 2706 to clamp the sleeve 2704 in adjusted position between the head of the screw and the slide.

A vertically elongated slot in the upper end of the slide 2706 embraces a shouldered portion of a screw stud 2707 threaded into a bushing fixed in the frame side plate 27. Another vertically elongated slot in the lower portion of the slide 2706 embraces an eccentric portion on the leftward end of a sleeve 2708 rotatable on a screw stud 2709 also threaded into a bushing fixed in the plate 27. A tension spring 2710 is anchored at its lower end on a stud 2711 secured in the plate 27 and is connected at its upper end to the lower end of the slide 2706 which it normally holds at the lower end of its vertical sliding movement on the stud 2707 and sleeve 2708. The normal position of the slide 2706 is determined by rotary adjustment of the sleeve 2708 prior to tightening the stud 2709 to clamp the sleeve 2708 between the head of the stud and the bushing in the plate 27. The sleeve 2704 is positioned so that it normally bears against the lower end of the slot in the link 2703.

A second slide 2712 has in its upper end a vertically elongated slot embracing the eccentric portion of the sleeve 2704 between the hexagonal flange and the link 2703. A washer 2713 is held on the head of the screw stud 2705 and against the right side of the link 2703 by a spring clip 2714 engaging in a circumferential groove in the head of the screw 2705. A vertically elongated slot in the lower portion of the slide 2712 embraces an eccentric portion on the right-hand end of the sleeve 2708. The slide 2712 is retained on the sleeve 2708 by the head of the screw stud 2709. A tension spring 2715 anchored at its lower end on the stud 2711 and connected at its upper end to the lower end of the slide 2712 normally holds the latter at the lower end of its vertical movement on the sleeves 2704 and 2708.

A rightwardly bent lug 2716 on the rear midportion of the slide 2712 is normally positioned immediately forward of a short upward projection 2717 on the rear end of a link 2718 guided for forward and rearward sliding movement on the studs 446 and 447. The forward end of the link 2718 is positioned immediately behind a stud 2719 secured in the lower end of the downward arm of a yoke member 2720 which is pivotally mounted on the stud 254 and is similar to the yoke member 737 of the above-mentioned Butler applications which it replaces. It differs from the yoke member 737 in that its lower arm is longer and provided with the stud 2719 and, instead of being slotted to embrace the stud 736 of the link 734, it bears against the rear side of the latter stud. A tension spring 2721 connected at its rearward end to a stud in the link 2718 and at its forward end to the stud 2719 normally holds the forward end of the link 2718 engaged against the stud 2719. Like the yoke member 737 of said Butler applications, the yoke member 2720 is rocked clockwise by depression of either of the subtract keys 318 or 324 and pulls the link 734 forwardly against the tension of the spring 735 to rock the lever 732 counterclockwise on the stud 733 and rock the lever 730 clockwise to place its hook 729 under the stud 727 so that when, in the cycle of operation of the machine, the cam 726 operates the ribbon mechanism to elevate the ribbon 714 to printing position, the lower red portion of the ribbon will be located at the printing line of the platen 1057. The spring 735 normally holds the hook 729 rearwardly of the stud 727 so that in machine operations in which neither subtract key 318 or 324 is depressed and the lane 12 ribbon control is inactive, the cam 726 will elevate the ribbon 714 only to its black printing position, all as described in detail in the above-mentioned Butler applications. The spring 735 also normally holds the link 734 and stud 736 rearwardly thereby holding the stud 2719 and link 2718 in the normal rearward positions of Fig. 1.

Forwardly of the projection 2717 on the link 2718, another projection 2722 extends upwardly behind a stud 2723 in the lower end of a link 2724 which is pivotally hung at its upper end on a stud in a rearwardly extending arm 2725 of a modified form of lane 12 bell crank 2726 which is pivotally mounted on the stud 1870 and replaces the lane 12 bell crank 1862 of the previously mentioned Butler applications. The stud 2723 extends through an irregular aperture 2727 in the slide 2706. The aperture 2727 has a vertically relatively short forward portion and a relatively deep rearward portion, the rear end of the lower edge of the forward portion of the aperture having a small hump 2728 adjoining the forward edge of the deeper rear portion of the aperture. A tension spring 2729 connected between a stud in the link 2724 and a stud 2730 secured in the plate 27 normally holds the stud 2723 against the projection 2722 and a little rearwardly of the hump 2728.

When a subtract key 318 or 324 is depressed, the yoke 2720 is rocked clockwise and the spring 2721 is tensioned as the projection 2717 is held by the lug 2716. Very early in the machine cycle, the mid-portion of the arm 2701 is elevated by the cam 2702, and, if a control projection 1767 is then above the sensing pin 2700, the rise of the latter and of the leftward end of the arm 2701 is limited and the rightward end of the arm 2701 is raised against the tension of its spring 1873.

The control projections 1767, as disclosed in the Butler applications, are of various lengths designated by numbers from #1 to #9. The projections employed in the present lane 19 control are of #5, #6 and #7, the former being the longest and the last the shortest of the three. A #7 projection is placed in lane 19 to be active when the paper carriage is in a columnar position where the ribbon mechanism may sometimes be conditioned for red printing by depression of one of the subtract keys 318 and 324 and it is desired to set the lane 19 control so that, in a subsequent position of the paper carriage in a subsequent machine cycle for which no subtract key is to be depressed, the ribbon mechanism will be operated to produce red printing if and only if red printing was caused by depression of a subtract key for the machine cycle performed with the carriage in the first-mentioned columnar position.

Figure 3:
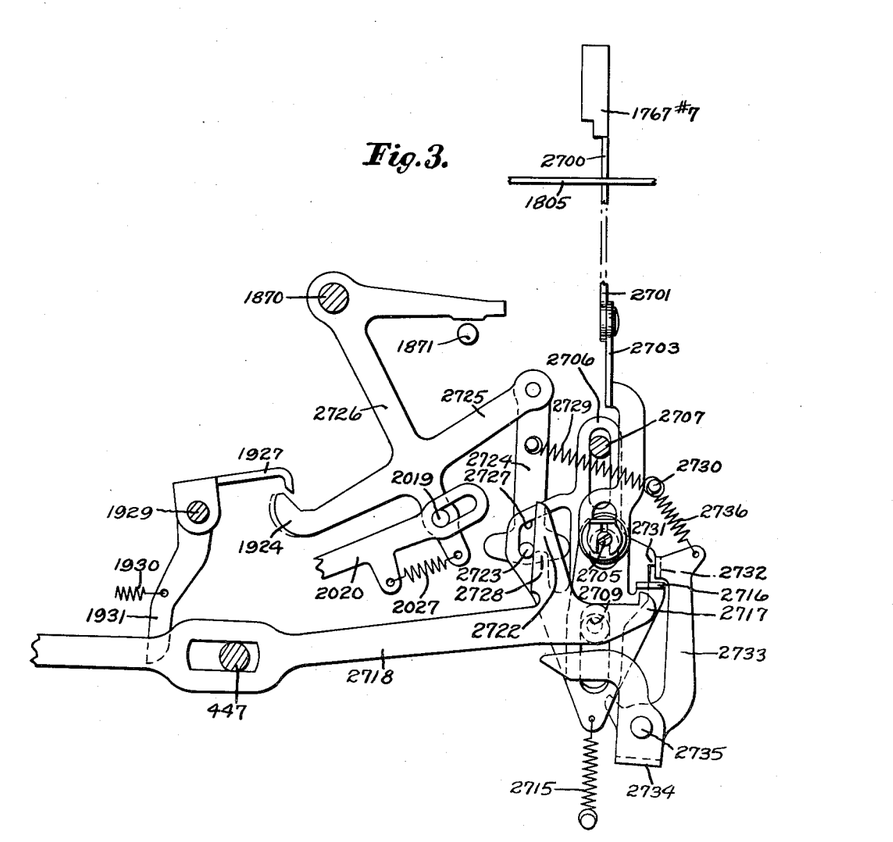
Fig. 3 is a right side elevation of portions of the control mechanism of Fig. 1, showing the positions taken by the parts at a certain point in a machine operation initiated by depression of a subtract motor bar with the carriage in the first of a plurality of positions in which printing is to be effected in red.

A #7 control projection causes the rightward end of the control arm 2701, the link 2703 and the slides 2706 and 2712 to be raised to the positions of Fig. 3 which shows the position of the link 2703 and slides 2706 and 2712 when the peak of the rise of the cam 2702 reaches the roller 1913 on the arm 2701. As the lug 2716 is lifted clear of the projection 2717, the link 2718 is pulled forwardly by the stretched spring 2721 (Fig. 1) and the projection moves under the rear edge portion of the lug 2716 before the projection 2722 of the link 2718 moves the stud 2723 forwardly against the tension of the light spring 2729 far enough to contact the rear side of the hump 2728. Thus, as the peak of the cam 2702 passes the roller 1913 to permit the arm 2701 to be lowered by its spring 1873 and the slide 2706 to be lowered by its spring 2710, the projection 2717, being under the rear edge of the lug 2716, blocks return of the slide 2712 by its spring 2715. The spring 2721 is of sufficient strength to pull the stud 2723 forwardly over the hump 2728 at least when the slide 2706 reaches its normal lower position if not sooner.

As described in detail in the above-mentioned Butler applications, the subtract keys 318 and 324, when depressed, remain latched down and are not restored until after printing has occurred in the machine cycle. The depressed subtract key or keys will thus hold the link 734, lever 732 and red ribbon hook 729 in the red ribbon position to cause red printing in the machine cycle performed with a subtract key depressed. Upon restoration of the subtract key or keys, the spring 735 restores the lever 732 and red ribbon hook 729, and pulls the link 734, yoke 2720, stud 2719 and link 2718 rearwardly to normal position, permitting the spring 2715 to restore the slide 2712 and lower the lug 2716 in front of the projection 2717 to relatch the link 2718 in its normal position. The spring 2027 urges the bell crank 2726 clockwise and the stud 2723 downward with sufficient force to prevent the light spring 2729 from moving the stud 2723 rearwardly over the hump 2728 even when the stud 2022 is in the rearward portion of the slot in the forward end of the link 2020. When the stud 2022 is in its normal position in the forward end of the slot in the forward end of the link 2020, the spring 735 still further increases the downward pressure on the stud 2723. At the end of the machine operation initiated with a subtract key 318 or 324 depressed and with the paper carriage in a position where a #7 control projection 1767 is active in lane 19, the parts are again in the positions of Fig. 1 except that the stud 2723 is then in the shallow dip or pocket of the aperture 2727 just in front of the hump 2728.

Figure 4:
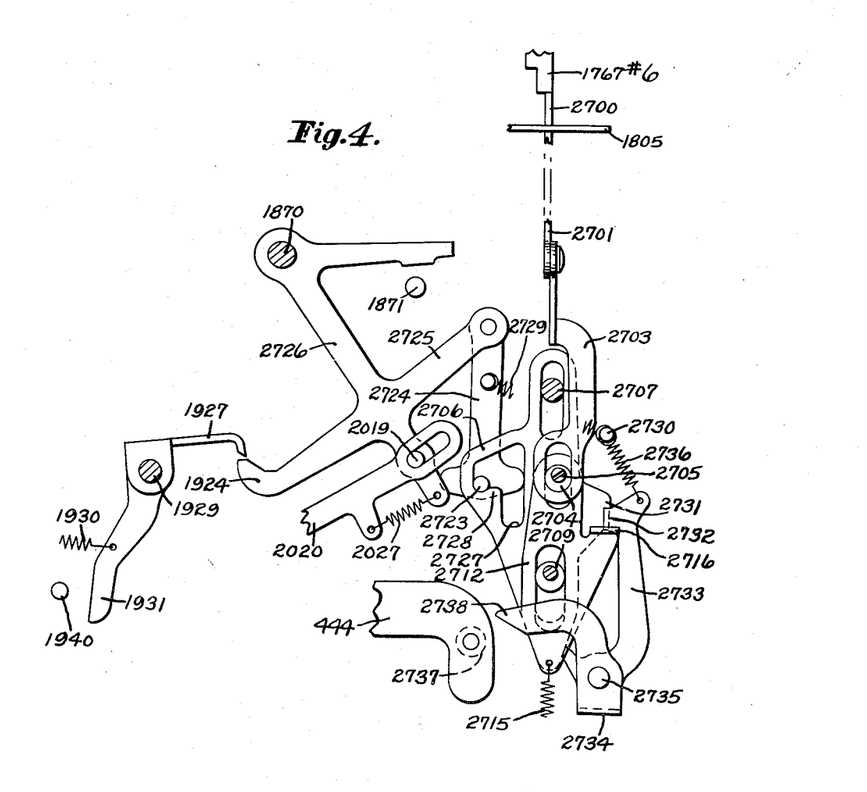
Fig. 4 is a view similar to Fig. 3 but shows the parts in positions to which they are moved at the same point in a subsequent one but not the last of the machine operations in which printing is to be effected in red.
Figure 5:
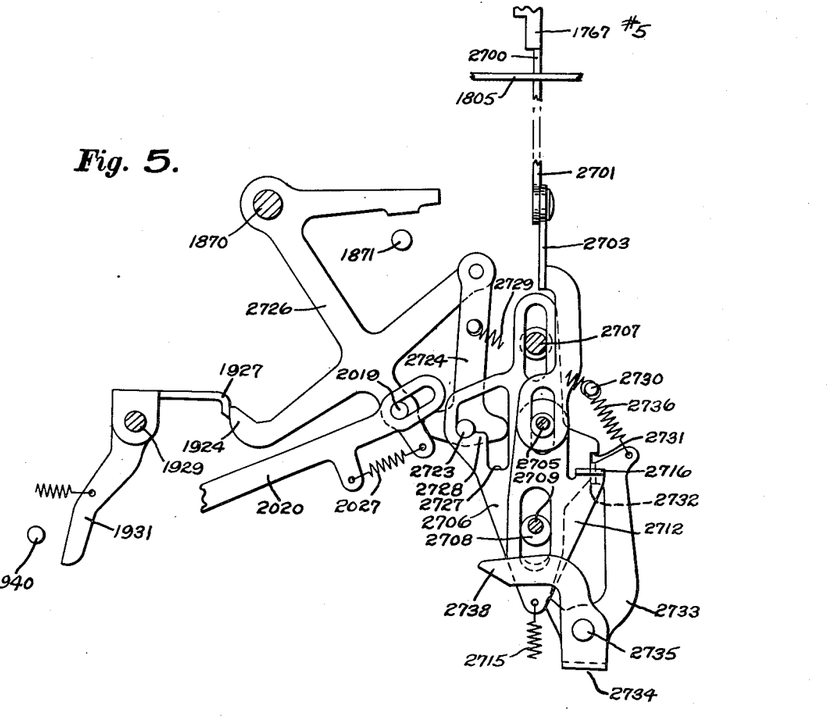
Fig. 5 is a view similar to Figs. 3 and 4 but shows the parts and positions to which they are moved at the same point in the last of the machine operations in which printing is to be effected in red.

While the stud 2723 remains thus held forward of the hump 2728, if the machine is cycled with the paper carriage in a columnar position where a #6 projection 1767 is in active position in lane 19, the cam 2702 will lift the right-hand end of the arm 2701, the link 2703 and the slides 2706 and 2712 to the positions of Fig. 4. As the slide 2706 moves upward, the stud 2723 seated in the shallow dip or pocket in front of the hump 2728 is also carried upward so that the link 2724 rocks the bell crank 2726 counterclockwise. Through the tension spring 2027, the bell crank 2726 pulls the link 2020 rearwardly and the latter rocks the lever 732 counterclockwise. Such movement of the bell crank 2726 and lever 732 produced by the lane 19 cam 2702 while a #6 projection 1767 is over the lane 19 sensing pin 2700 is sufficient to place the red ribbon hook 729 under the roller 727 and thus place the ribbon control mechanism in condition for red printing, but it is just insufficient to move the latching projection 1924 on the lane 12 bell crank 2726 rearwardly of the latch bail 1927. It will be noted that the latch point of the latching projection 1924 on the lane 19 bell crank 2726 is cut off so that, though it is still capable of latching engagement behind the depending lip of the latch bail 1927, nevertheless when it is directly under the latch lip of the bail 1927 as shown in Fig. 4, it does not hold the latching lip of the bail 1927 high enough to prevent it from latching other control bell cranks with which the bail 1927 cooperates.

The upward movement of the slide 2706 when the #6 projection 1767 is over the sensing pin 2700 is sufficient to lift a latch shoulder 2731 on the rear edge of the slide 2706 slightly above a leftwardly bent lug 2732 on an upwardly extending left side arm 2733 of a latch yoke 2734 pivotally mounted on a stud 2735 secured in the frame plate 27. As the shoulder 2731 clears the lug 2732, a tension spring 2736 connected between the stud 2730 and the upper end of the arm 2733 pulls the latter forwardly to move the lug 2732 into latching position under the shoulder 2731. The latch lug 2732 remains effective until, after printing has been effected in the machine cycle, a roller stud 2737 on the slide 444 moves rearwardly into engagement with a downwardly and rearwardly sloping cam edge on the forward end of a right-hand side arm 2738 of the yoke 2734 and rocks the latter clockwise to withdraw the lug 2732 from beneath the shoulder 2731 and permits the spring 2710 to restore the slide 2706 to its normal lower position. As disclosed in detail in the above-mentioned Butler applications, the slide 444 is moved rearwardly shortly after printing has been effected and is returned forwardly to normal position again much later in each machine cycle. Thus, the slide 2706, the lane 12 bell crank 2726, link 2020, lever 732 and red ribbon hook 729 are latched in red printing condition until after printing is effected in the machine cycle, even though the lane 12 bell crank is not latched by the latching bail 1927 by which it is held in red printing position when moved thereto in consequence of a #5 projection 1767 in active position in lane 12 as disclosed in detail in the above-mentioned Butler applications. Though the slide 2706 is held in raised position by the latch lug 2732 at the time the sensing pins are lowered to normal position, the slot in the link 2703 through which the stud 2705 and sleeve 2704 pass is of sufficient length to permit the link 2703 and the arm 2701 to be lowered to normal position by the spring 1873 as the peak of the cam 2702 passes the roller 1913. The slide 2712 is held elevated by the stud 2705 and sleeve 2704.

Thus, after red printing has been caused by a depressed subtract key with the carriage in a columnar position where a #7 projection 1767 is active in lane 19, red printing can be obtained without depression of subtract keys in one or more subsequent columnar positions where #6 projections 1767 are located, though black printing will be effected in the latter columnar positions if a subtract key was not depressed for the machine cycle performed with the carriage in the first-mentioned columnar position. In the latter event, the stud 2723 will be in its normal rearward position in the aperture 2727 as the slide 2706 is raised and will be received in the deep rearward part of the aperture 2727 without being lifted to rock the lane 12 bell crank 2726.

In the last of the columnar positions in which red printing is to be effected if and only if a subtract key was depressed to cause red printing in the first of those columnar positions, a #5 projection 1767 is employed in lane 19 not only to cause red printing in that last columnar position but also to restore the lane 19 control to normal. In a machine cycle in which a #5 projection 1767 is above the lane 19 sensing pin 2700, the link 2703 and slides 2706 and 2712 are raised high enough so that, if the stud 2723 is in the shallow pocket in front of the hump 2728, the lane 12 bell crank 2726 is rocked far enough counterclockwise to place its latch point 1924 behind the latch lip of the bail 1927 which then holds the bell crank 2726 and thus also the link 2020, lever 732 and red ribbon hook 729 in red printing position until very late in the machine cycle when, as described in detail in the above-mentioned Butler applications, the bail 1927 is rocked counterclockwise to release any latch points 1924 which were held by it, and the spring 735 restores the lever 732, hook 729, link 2020 and bell crank 2726 to normal. Much earlier in the machine cycle, and prior to operation of the printing mechanism, the peak of the cam 2702 passes the roller 1913 permitting the slides 2706 and 2712 to be moved downward by the springs 2710 and 2715 until the shoulder 2731 rests on the lug 2732 of the latch arm 2733. Thereby, the hump 2728 is moved downward below the stud 2723 which is then freely moved to its normal rearward position by the spring 2729. Shortly after printing is effected the latch yoke 2734 is rocked as previously described to withdraw the lug 2732 from under the shoulder 2731 whereupon the slides 2706 and 2712 are returned to their normal lower positions by their springs 2710 and 2716 while the bell crank 2726 is still held latched by the latch bail 1927. When the bail 1927 is moved to releasing position very late in the machine cycle, the bell crank 2726, link 2020, lever 732 and red ribbon hook 729 are restored to normal by the spring 735. The stud 2723 remains in its normal rearward position against the forward edge of the projection 2722.

It will readily be understood that if the stud 2723 is in its rearward position in a machine operation in which a #5 projection 1767 is above the pin 2700, the stud 2723 will be received in the deep rear portion of the aperture 2727 without being raised to rock the lane 12 bell crank 2726 and printing will be black.

It will easily be seen that the "red ribbon repeat" control of lane 19 will not interfere with the normal operation of the lane 12 red ribbon control because, of the parts incorporated in the lane 19 control, only the light spring 2729 offers an added but very light resistance to counterclockwise rocking of the bell crank 2726 by the lane 12 control arm 1840. Also depression of either or both of the subtract keys 318 and 324 causes only the normal single operation control of the bicolor ribbon 714 at all times except when a #7 control projection 1767 is above the lane 19 sensing pin 2700. It will be apparent that the new lane 19 control will not interfere with any of the other red ribbon controls of the machine disclosed in the Butler application.

Figure 6:
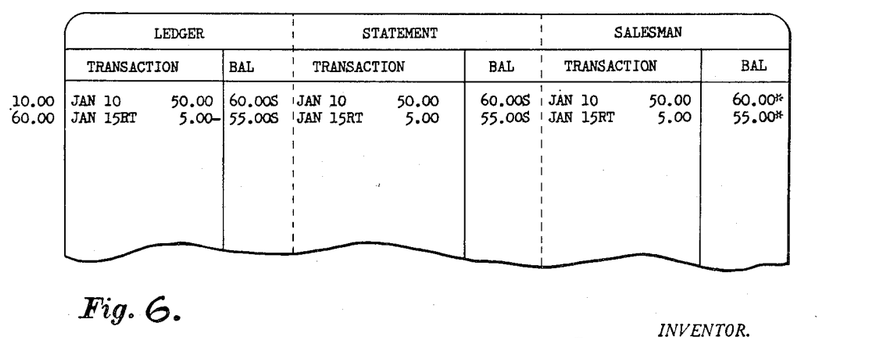
Fig. 6 shows, by way of example, a sample of work performed by the machine embodying improved bicolor ribbon control mechanism of the present invention.

For a simple illustration of work for which the present invention is particularly advantageous, Fig. 6 shows original ledger, statement and salesman's record forms. The illustrated ledger, statement and salesman's record forms each have only a single transaction column and a balance column but it will readily be understood that separate debit and credit columns may be provided when desired. In the latter event, it is desirable that items, such as returned merchandise items which have the effect of canceling previous entries, such as charges for the same articles of merchandise previously entered, should be entered in red in the debits columns rather than in the credits columns. In any case, control projections 1767 are placed in lane 19 in the control pan 1731 for each column in which printing is effected sometimes in black and sometimes in red.

In the illustrated example, the first carriage position is an old balance pick-up position where the amounts of old balances may be printed on the left margin of a journal sheet or not printed if not required by the accounting system. In lane 19 in the control pan 1731, a #7 control projection 1767 will be inserted for the second carriage position (ledger "Transaction" column), a #6 control projection 1767 will be provided for the fourth carriage position (statement "Transaction" column) and a #5 control projection 1767 will be provided for the sixth carriage position (salesman's record "Transaction" column). In the first line of entries dated "Jan. 10" the entries are printed in black in all columns as the carriage tabulates to each of the columnar positions in succession. The old balance is automatically added in one crossfooter with the carriage in the first position. With the carriage in the second position (ledger "Transaction" column) the "50.00" item is added into both crossfooters. In the ledger "Bal." position, the first crossfooter is subtotaled so that the 60.00 balance is printed. In the statement "Transaction" position, the second crossfooter is subtotaled so that the 50.00 charge item is again printed, and in statement "Bal." position the first crossfooter is again subtotaled. In the salesman's record "Transaction" column the second crossfooter is totaled and cleared and in the last carriage position the first crossfooter is totaled and cleared after which the carriage is returned to the pick-up position. Because neither subtract key 318 nor 324 is depressed for the entry in the ledger "Transaction" column, the stud 2723 remains rearward of the hump 2728. Consequently, the lifting of the slide 2706 in the machine operations for printing in the "Transaction" columns of the statement and salesman's record forms does not raise the stud 2728 or rock the lane 12 bell crank to condition the ribbon mechanism for red printing.

For the machine operation for the second entry, "Jan 15 RT 5.00—" in the ledger "Transaction" column, the operator depresses both of the subtract keys 318 and 324 which causes the "5.00" item to be entered subtractively in both crossfooters. Depression of either or both of the subtract keys causes the entry to be printed in red and, because of the #7 control projection 1767 in lane 19, also causes the stud 2723 to be moved over the hump 2728 and set in the shallow pocket in front of the latter. Consequently, though the prints in each of the balance columns will be in black, the #6 control projection 1767 in lane 19 will cause the lane 12 bell crank 2726 to be rocked to cause red printing in the statement "Transaction" column and the #5 control projection 1767 in lane 19 causes red printing in the "Transaction" column of the salesman's record form and causes the stud 2723 to be returned to its normal position rearward of the hump 2728 so that no red prints will be made in the next line of entries if no subtract key is depressed for the entry in the ledger "Transaction" column. Thus, a single subtraction key depression for an operation of the machine with the carriage in a predetermined columnar position sets the new lane 19 control means to cause red printing to be effected in selected subsequent operations of the machine with the carriage in other columnar positions for which no subtract key is depressed and in which printing would be effected in black if no subtract key were depressed for the first-mentioned operation. In intervening machine operations with the carriage in positions, such as the ledger and statement "Bal." positions in the above example, where no control projections 1767 are placed in lane 19, printing is effected in black except when red printing of negative subtotals and totals is caused by automatic controls disclosed in the Butler application.

All of the machine cycles for the remainder of each line of entries subsequent to the first operation in which red printing may be effected, may be automatically initiated so that the operator would have no opportunity to depress a subtract bar or set any other manual control for the subsequent red printing operations. Also because the entries in the intervening "Bal." columns are to be in black, no manual control which would cause red printing in those columns can be kept in red printing condition through the whole series of operations. The present invention eliminates any need to use two automatic control programs, one including and the other not including lane 12 control of the bicolor ribbon, and to adjust the machine to render one control program effective before starting a line of entries in which printing is to be effected in red in some columns, and then again adjusting the automatic controls to render the other control program effective before starting a line of entries in which printing is to be effected in black in the same columns.

From the foregoing, the use and advantages of the invention in varieties of accounting work other than the one illustrated above by way of example will be readily understood by those who are skilled in the art. It will also be understood that various details of the illustrated mechanism may readily be modified within the scope of the appended claims.

I claim:

1. In an accounting machine having means for driving it through cycles of operation, a paper carriage movable transversely to a series of columnar positions, printing mechanism including a bicolor ribbon mechanism normally conditioned for printing in one color but conditionable for printing in the other color, means to condition said ribbon mechanism for printing in said other color, and manipulative means operable prior to a machine cycle to control said conditioning means to condition said ribbon mechanism for printing in said other color in said machine cycle, the combination of means controlled by said carriage in accordance with the columnar positions thereof, means controlled jointly by said manipulative means and said carriage-controlled means, and means settable by said jointly controlled means when said manipulative means is in manipulated position and said carriage is in a predetermined columnar position for subsequent operation by said carriage-controlled means alone to operate said conditioning means to condition said ribbon mechanism for printing in said other color when said carriage is in another of its columnar positions.

2. In the combination according to claim 1, means positioned on said carriage to cause said carriage-controlled means, when said carriage is in a predetermined columnar position, to set said settable means when said manipulative means is also in manipulated position, means controlled by said carriage-controlled means to restore said settable means to normal, and means positioned on said carriage to cause said carriage-controlled means, when said carriage is in said other columnar position, to operate said settable means to operate said conditioning means to condition said ribbon mechanism for printing in said other color, and to enable said restoring means to restore said settable means to normal.

3. In the combination according to claim 1, means positioned on said carriage to cause said carriage-controlled means, when said carriage is in a predetermined columnar position, to set said settable means when said manipulative means is also in manipulated position, and means positioned on said carriage to cause said carriage-controlled means, when said carriage is in said other columnar position, to operate said settable means to operate said conditioning means to condition said ribbon mechanism for printing in said other color.

4. In the combination according to claim 3, means controlled by said carriage-controlled means to restore said settable means to normal, and further means positioned on said carriage to cause said carriage-controlled means, when said carriage is in a third one of its columnar positions, to operate said settable means to operate said conditioning means to condition said ribbon mechanism for printing in said other color, and to enable said restoring means to restore said settable means to normal.

5. In an accounting machine having means for driving it through cycles of operation, a paper carriage movable transversely to a series of columnar positions, printing mechanism including a bicolor ribbon mechanism normally conditioned for printing in one color but conditionable for printing in the other color, means to condition said ribbon mechanism for printing in said other color, and manipulative means operable prior to a machine cycle to control said conditioning means to condition said ribbon mechanism for printing in said other color in said machine cycle, the combination of means controlled by said carriage in accordance with the columnar positions thereof and operated by said driving means early in machine cycles and restored to normal prior to printing in said machine cycles, means controlled jointly by said manipulative means and said carriage-controlled means, means settable by said jointly controlled means in a machine cycle performed when said manipulative means is in manipulated position and said carraige is in a predetermined columnar position for subsequent operation by said carriage-controlled means alone to operate said conditioning means to condition said ribbon mechanism for printing in said other color in subsequent machine operations performed with said carriage in another of its columnar positions, means positioned on said carriage to cause said carriage-controlled means, in a machine cycle performed when said carriage is in a predetermined columnar position, to be operated to set said settable means when said manipulative means is also in manipulated position, means positioned on said carriage to cause said carriage-controlled means, in a machine cycle performed when said carriage is in said other columnar position, to be operated to operate said settable means to operate said conditioning means to condition said ribbon mechanism for printing in said other color, means to detain said carriage-controlled means in operated position to hold said settable means and conditioning means in operated position to keep said ribbon mechanism in condition for printing in said other color, and means to release said detaining means after printing in the last mentioned machine cycle to permit said conditioning means and ribbon mechanism to return to normal.

6. In the combination according to claim 5, means to restore said settable means to normal, further means positioned on said carriage to cause said carriage-controlled means, in a machine cycle performed when said carriage is in a third one of its columnar positions, to be operated to operate said settable means to operate said conditioning means to condition said ribbon mechanism for printing in said other color, and to enable said restoring means to restore said settable means to normal, and further detaining means to detain said conditioning means in operated condition until after printing and after said settable means has been restored by said restoring means.

BYRON A. RUNDE.

REFERENCES CITED

The following references are of record in the file of this patent:

UNITED STATES PATENTS

| Number | Name | Date |
|---|---|---|
| 1,271,663 | Carhart | July 9, 1918 |
| 1,277,500 | Stickney | Sept. 3, 1918 |
| 1,950,762 | Thompson | Mar. 13, 1934 |
| 2,038,716 | Christian | Apr. 28, 1936 |